United States Patent
Ishiuchi

(10) Patent No.: US 12,548,179 B2
(45) Date of Patent: Feb. 10, 2026

(54) FUNCTIONAL EVALUATION SYSTEM OF HIPPOCAMPUS AND DATA CREATION METHOD

(71) Applicant: UNIVERSITY OF THE RYUKYUS, Okinawa (JP)

(72) Inventor: Shogo Ishiuchi, Okinawa (JP)

(73) Assignee: UNIVERSITY OF THE RYUKYUS, Okinawa (JP)

( * ) Notice: Subject to any disclaimer, the term of this patent is extended or adjusted under 35 U.S.C. 154(b) by 257 days.

(21) Appl. No.: 18/039,054

(22) PCT Filed: Dec. 3, 2021

(86) PCT No.: PCT/JP2021/044452
§ 371 (c)(1),
(2) Date: May 26, 2023

(87) PCT Pub. No.: WO2022/118952
PCT Pub. Date: Jun. 9, 2022

(65) Prior Publication Data
US 2024/0005544 A1    Jan. 4, 2024

(30) Foreign Application Priority Data
Dec. 4, 2020    (JP) ................ 2020-202000

(51) Int. Cl.
*G06T 7/62*    (2017.01)
*A61B 5/00*    (2006.01)
*G06T 7/00*    (2017.01)
*G16H 50/30*    (2018.01)
*G16H 50/70*    (2018.01)

(52) U.S. Cl.
CPC .............. *G06T 7/62* (2017.01); *A61B 5/4064* (2013.01); *G06T 7/0014* (2013.01); *G06T 2207/10088* (2013.01); *G06T 2207/20021* (2013.01); *G06T 2207/30016* (2013.01); *G16H 50/30* (2018.01); *G16H 50/70* (2018.01)

(58) Field of Classification Search
CPC . G06T 2207/10088; G06T 2207/30016; G06T 7/0012; G06T 7/11; G06T 7/62; A61B 5/4064
See application file for complete search history.

(56) References Cited

FOREIGN PATENT DOCUMENTS

| JP | 2015-195835 | 11/2015 |
| JP | 2019-63512 | 4/2019 |
| JP | 2019-63513 | 4/2019 |

OTHER PUBLICATIONS

Amazon Machine Learning, Binary Classification, 2017, https://web.archive.org/web/20170810130546/https://docs.aws.amazon.com/machine-learning/latest/dg/binary-classification.html (Year: 2017).*

(Continued)

*Primary Examiner* — Raphael Schwartz
(74) *Attorney, Agent, or Firm* — Wenderoth, Lind & Ponack, L.L.P.

(57) ABSTRACT

A functional evaluation system of hippocampus that includes: an acquisition unit that acquires image data representing a hippocampus of a subject; and an identification unit that identifies volume data representing a volume of a left hippocampal-amygdaloid transition area of the subject, in accordance with the image data.

4 Claims, 9 Drawing Sheets

(56) References Cited

OTHER PUBLICATIONS

Van Petten, Cyma. "Relationship between hippocampal volume and memory ability in healthy individuals across the lifespan: review and meta-analysis." Neuropsychologia 42.10 (2004): 1394-1413. (Year: 2004).*

Zuppichini, Mark D., and Joshua Sandry. "Pilot investigation of the relationship between hippocampal volume and pattern separation deficits in multiple sclerosis." Multiple sclerosis and related disorders 26 (2018): 157-163. (Year: 2018).*

Usugi, Ryoichi, Masahiko Nishimura, and Shogo Ishiuchi. "Analysis of human hippocampal volumetry in relation to pattern separation ability in healthy young subjects." Brain and Behavior 10.12 (Oct. 23, 2020): e01878. (Year: 2020).*

International Search Report (ISR) issued Feb. 15, 2022 in International (PCT) Application No. PCT/JP2021/044452.

Ryoichi Usugi et al., "Analysis of human hippocampal volumetry in relation to pattern separation ability in healthy young subjects", Brain and Behavior, vol. 10, issue 12, pp. 1-10, Oct. 23, 2020, cited in ISR.

Ayano Shiroma et al., "Cerebellar Contribution to Pattern Separation of Human Hippocampal Memory Circuits", Cerebellum, 15, pp. 645-662, 2016, cited in ISR.

Thiago F.A. Franca et al., "Hippocampal neurogenesis and pattern separation: A meta-analysis of behavioral data", Wiley, vol. 27, pp. 937-950, 2017.

Gerd Kempermann et al., "More hippocampal neurons in adult mice living in an enriched environment", Nature, vol. 386, pp. 493-496, Apr. 3, 1997.

Jill K. Leutgeb et al., "Pattern Separation in the Dentate Gyrus and CA3 of the Hippocampus", Science, vol. 315, pp. 961-968, Feb. 16, 2007.

Peter S. Eriksson et al., "Neurogenesis in the adult human hippocampus", Nature Medicine, vol. 4, No. 11, Nov. 1998.

Arnold Bakker et al., "Pattern Separation in the Human Hippocampal CA3 and Dentate Gyrus", Science, vol. 319, pp. 1640-1644, Mar. 21, 2008.

Edmund T. Rolls., "The mechanisms for pattern completion and pattern separation in the hippocampus", Frontiers in Systems Neuroscience, vol. 7, Article 74, Oct. 2013.

Toshiaki Nakashiba et al., "Young Dentate Granule Cells Mediate Pattern Separation, whereas Old Granule Cells Facilitate Pattern Completion", Cell, vol. 149, pp. 188-201, Mar. 30, 2012.

Ayano Shiroma et al., "Cerebellar Contribution to Pattern Separation of Human Hippocampal Memory Circuits", Cerebellum, vol. 15, pp. 645-662, 2016.

* cited by examiner

PATTERN SEPARATION HATA VOLUMES OF TOP SCORER AND LOWEST SCORER

TOP SCORER, MALE, AGE 22, 93.8%    LOWEST SCORER, MALE, AGE 22, 13%

Left 42.89mm3    Right 46.22mm3    Left 71.37mm3    Right 76.11mm3
(ratio 0.26)    (ratio 0.28)    (ratio 0.35)    (ratio 0.38)

STEREOGRAPHS OF HATA INDICATED BY WHITE ARROWS ABOVE

FUNCTIONAL EVALUATION SYSTEM OF HIPPOCAMPUS AND DATA CREATION METHOD

TECHNICAL FIELD

This invention relates to a functional evaluation system of hippocampus, and a data creation method.

BACKGROUND ART

Neurogenesis reportedly continues over a lifetime even in adult brain (Non-Patent Literature 1), and takes place in subventricular zone and subgranular cell layer of hippocampal dentate gyrus (DG). The neurogenesis in DG has been reportedly associated in rodents with pattern separation, which is an ability to detect similar but different characteristics (Non-Patent Literatures 2 and 3). Blood oxygenation level dependent effect (BOLD) in the hippocampal DG has been observed by fMRI on humans given a behavioral task (Non-Patent Literatures 4 and 5).

On the other hand, a function of reproducing neural activity that corresponds to complete stimulation information, from incomplete stimulation information, is called pattern completion, and such function has been considered to reside in the hippocampal CA3 region for rodents (Non-Patent Literature 6), and to be associated with the CA1 and CA3 regions in humans (Non-Patent Literature 7).

An investigation with use of transgenic mice has demonstrated that younger granular cells in DG is involved in the pattern separation, meanwhile older cells are associated with the pattern completion, suggesting that young neurons gradually switch their roles towards the pattern completion as they get old (Non-Patent Literature 8).

It has been also reported that even adult rats placed under a good environment were found to increase the number and volume of the neonatal neuron in the subgranular layer of the dentate gyrus, and to demonstrate influences of elongation of dendrite and proliferation of glial cell, proving plasticity of the hippocampal volume (Non-Patent Literature 9).

On the other hand, the present inventors have conducted studies aiming at establishing a diagnostic method and a treatment method typically for 1) diffuse axonal injury caused by traffic accidents, overturning/fall accidents, etc., 2) hypoxic encephalopathy caused by myocardial infarction or stroke, 3) higher brain disfunction typically caused by carbon monoxide poisoning, and have proposed, for example, a method capable of simply and accurately evaluating the hippocampal function of a subject with no need for any large-scale device, and a system for evaluating the hippocampal function (Patent Literatures 1 to 3).

CITATION LIST

Patent Literatures

Patent Literature 1: JP 2015-195835 A
Patent Literature 2: JP 2019-63512 A
Patent Literature 3: JP 2019-63513 A

Non-Patent Literatures

Non-Patent Literature 1: Eriksson et al. (1998). Neurogenesis in the adult human hippocampus. Nature medicine, 4. 1313.

Non-Patent Literature 2: Leutgeb et al. (2007). Pattern separation in the dentate gyrus and CA3 of the hippocampus. Science, 315,961-966.

Non-Patent Literature 3: Franca, T. F., Bitencourt, A. M., Maximilla, N. R., Barros, D. M., & Monserrat, J. M. (2017). Hippocampal neurogenesis and pattern separation: A meta analysis of behavioral data. Hippocampus, 27, 937-950.

Non-Patent Literature 4: Bakker et al. (2008). Pattern separation in the human hippocampal CA3 and dentate gyrus. Science, 319, 1640-1642.

Non-Patent Literature 5: Shiroma et al. (2015). Cerebellar Contribution to Pattern Separation of Human Hippocampal Memory Circuits. The Cerebellum, 1-18.

Non-Patent Literature 6: Rolls, E. (2013). The mechanisms for pattern completion and pattern separation in the hippocampus. Frontiers in Systems Neuroscience, 7, 74.

Non-Patent Literature 7: Bakker et al. (2008). Pattern separation in the human hippocampal CA3 and dentate gyrus. Science 319, 1640-1642.

Non-Patent Literature 8: Nakashiba et al. (2012). Young dentate granule cells mediate pattern separation, whereas old granule cells facilitate pattern completion. Cell, 149, 188-201.

Non-Patent Literature 9: Kempermann, G., Kuhn, H. G., & Gage, F. H. (1997). More hippocampal neurons in adult mice living in an enriched environment. Nature, 386, 493.

SUMMARY OF INVENTION

Technical Problem

Relationship between the hippocampus subfield volume, and pattern separation or pattern completion has, however, remained unclear. From this point of view, the present inventors considered that the evaluation will have higher objectivity and reliability, if a new functional evaluation system of hippocampus and so forth were established.

The present invention has been arrived at in consideration of the aforementioned circumstances, and an object thereof is to provide a new functional evaluation system of hippocampus, and a data creation method, capable of objectively and reliably evaluating human hippocampal function, with use of a hippocampal subfield volume as an index.

Solution to Problem

A functional evaluation system of hippocampus of the present invention, aimed at solving the aforementioned problems, includes an acquisition unit that acquires image data representing a hippocampus of a subject; and an identification unit that identifies volume data representing a volume of a left hippocampal-amygdaloid transition area of the subject, in accordance with the image data.

A data creation method of the preset invention is a method for creating data for evaluating a hippocampal function of a subject, the method includes: acquiring image data that represents a hippocampus of a subject; and identifying volume data that represents a volume of a left hippocampal-amygdaloid transition area of the subject, in accordance with the image data.

Advantageous Effects of Invention

The functional evaluation system of hippocampus and the data creation method of the present invention enable highly objective and reliable evaluation of human hippocampal function.

DESCRIPTION OF EMBODIMENTS

The present inventors have focused on the relationship between the hippocampal subfield volume and the pattern separation or the pattern completion, and has newly found negative association between the volume of the left hippocampal-amygdaloid transition area (left HATA) and the hippocampal function. The amygdala is an organ that functions in conjunction with emotion, which shrinks under stable emotion, meanwhile expands under violently fluctuating emotion. The present inventors confirmed the relationship between improvement of pattern separation, or hippocampal memory, and shrinkage of the left hippocampal-amygdaloid transition area (left HATA). In short, small volume of the left hippocampal-amygdaloid transition area (left HATA) is considered to represent good hippocampal function, whereas large volume of the left hippocampal-amygdaloid transition area (left HATA) is considered to represent lowered hippocampal function. The present invention stands on this new finding. Note, that "hippocampus" in the present invention includes dentate gyrus.

An embodiment of a functional evaluation system of hippocampus 100 and a data creation method of the present invention will be described below.

Figure 1:
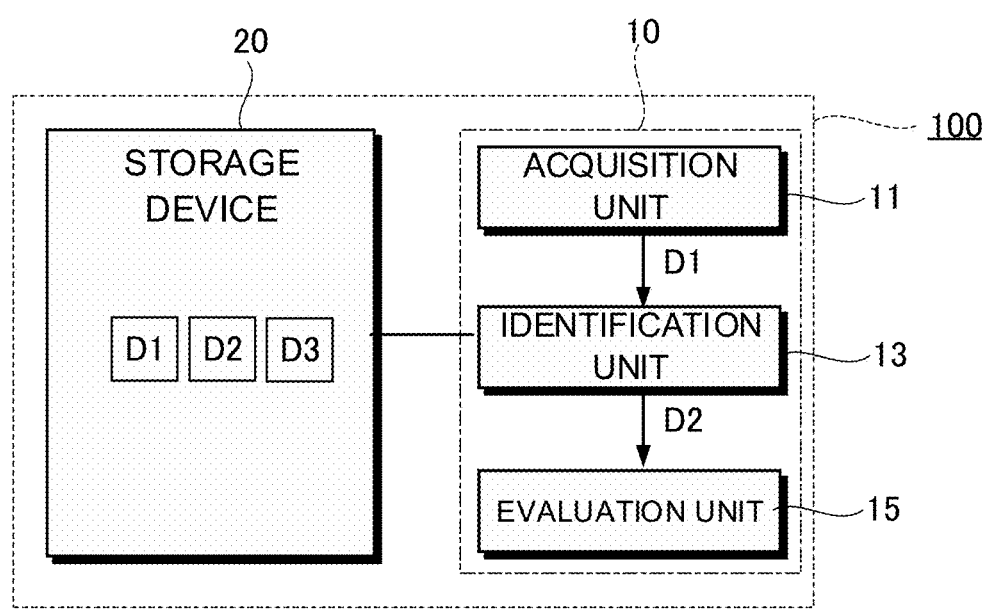
FIG. 1 is a block diagram illustrating a configuration of a functional evaluation system of hippocampus.

FIG. 1 is a block diagram illustrating a configuration of the functional evaluation system of hippocampus 100 according to this embodiment. The functional evaluation system of hippocampus 100 of this embodiment is aimed at evaluating the hippocampal function of the subject. More specifically, the functional evaluation system of hippocampus 100 has a control device 10 and a storage device 20.

The control device 10 is one or a plurality of processors that controls each element of the functional evaluation system of hippocampus 100. More specifically, the control device 10 is typically configured with one or more types of processor selected from central processing unit (CPU), sound processing unit (SPU), digital signal processor (DSP), field programmable gate array (FPGA), and application specific integrated circuit (ASIC). The control device 10 evaluates the hippocampal function of the subject.

The storage device 20 is one or a plurality of memories that stores program to be executed by the control device 10, and various data used by the control device 10. The storage device 20 is typically configured with any of known recording media such as magnetic recording medium or semiconductor recording media, or a combination of these recording media. Note that the storage device 20 may be provided (typically as a cloud storage) separately from the functional evaluation system of hippocampus 100, and the control device 10 may write to, or read from the storage device 20 through a mobile communication network or a communication network such as the Internet. That is, the storage device 20 is omissible from the functional evaluation system of hippocampus 100.

As illustrated in FIG. 1, the control device 10 of this embodiment is multiply functionalized (as an acquisition unit 11, an identification unit 13, and an evaluation unit 15) so as to evaluate the hippocampal function of the subject, as a result of execution of the program stored in the storage device 20.

The acquisition unit 11 acquires image data D1 that represents the hippocampus of the subject, from the storage device 20. The image data D1 is displayed on a display device (not illustrated). The image data D1 is typically anatomical three-dimensional image data of hippocampus, obtained with use of a known device such as MRI scanner. The anatomical three-dimensional image data of hippocampus, when used, is preferably displayable by hippocampal subfields, which is itemized by hippocampal tail, subiculum, presubiculum, parasubiculum, Ammon's horn (CA)1, CA3, CA4, dentate gyrus granule cell layer (GC-DG), hippocampal molecular layer, hippocampal-amygdaloid transition area (HATA), and hippocampus fimbria. Also hippocampal fissure is displayable.

The image data D1 may also be image-processed in various ways, typically by motion correction, skull stripping, intensity normalization, white matter segmentation, 3D imaging (tessellation) of gray/white matter, and surface extraction. Such image processing is accessible typically with use of FreeSurfer 6.0 (http://surfer.nmr.mgh.harvard.edu).

The identification unit 13 identifies data (referred to as "volume data", hereinafter) D2 that represents the volume of the left hippocampal-amygdaloid transition area (left HATA) of the subject. The identification unit 13 in this embodiment identifies the volume data D2, in accordance with the image data D1 acquired by the acquisition unit 11. The volume data D2 is identified with use of any of known techniques. Now, the volume data D2 may be the volume as it is, or may be data obtained by appropriately processing the volume (typically obtainable by multiplying the volume by a coefficient). The thus identified volume data D2 is stored in the storage device 20.

The size of the head correlates with the size of the body, and the size of the brain correlates with the size of the head. Hence, the identification unit 13 is preferably configured to identify the volume data D2, by normalizing the volume of the left hippocampal-amygdaloid transition area (left HATA).

A specific method of identifying the volume data D2 is exemplified by 1) directly analyzing raw data of the hippocampal volume; 2) analyzing a value obtained by dividing the hippocampal volume by the volume of brain or skull; and 3) "residual analysis" based on multiple regression or ANCOVA, by removing covariate such as brain volume, skull or height. Also factors such as gender and age are adjustable. According to such method, the identification unit 13 can identify the volume data D2 that represents the volume of the hippocampal subfield (left hippocampal-amygdaloid transition area (left HATA)).

The evaluation unit 15 evaluates the hippocampal function of the subject, in accordance with the volume data D2 identified by the identification unit 13. More specifically, the evaluation unit 15 evaluates the hippocampal function (pattern separation, pattern completion, etc.) of the subject, in accordance with the volume data D2 identified by the identification unit 13 and the negative association between the reference data that represents the volume of the left hippocampal-amygdala transition area (left HATA) and the hippocampal function. The hippocampal function of the subject is evaluated, in accordance with the volume data D2, and data (referred to as "preparatory data", hereinafter) D3 that represents the negative association between the reference data and the hippocampal function. The preparatory data D3 is created preliminarily, and stored in the storage device 20.

Note that the reference data represents the volume of the left hippocampal-amygdaloid transition area (left HATA), previously identified for the subject (or other subject). The preparatory data D3 is then created typically by correlating the reference data with evaluation of the hippocampal function. For example, the evaluation unit 15 identifies the evaluation correlated to the volume data D2 in the preparatory data D3, as the hippocampal function of the subject. Note that the evaluation unit 15 is omissible from the functional evaluation system of hippocampus For example, the evaluation unit 15 can evaluate the hippocampal function to be good if the volume of the left hippocampal-amygdaloid transition area (left HATA) is small, meanwhile can evaluate the hippocampal function to be lowered, if the volume of the left hippocampal-amygdaloid transition area (left HATA) is large.

In an embodiment of the functional evaluation system of hippocampus 100, for example, the evaluation unit 15 evaluates the hippocampal function to be lowered, if the level indicated by the volume data D2 identified by the identification unit 13 is equal to or higher than a preset threshold value. On the other hand, the evaluation unit 15 evaluates the hippocampal function to be enhanced, if the level indicated by the volume data D2 is smaller than the preset threshold value. Such threshold value may properly be set in accordance with the negative association between the reference data that represents the volume of the left hippocampal-amygdaloid transition area and the hippocampal function. The threshold value may also be set typically in consideration of characteristic and condition of the subject.

In another embodiment of the functional evaluation system of hippocampus 100, the evaluation unit 15 may typically evaluate the hippocampal function of the subject, in accordance with difference between volume data (A) of the left hippocampal-amygdaloid transition area of a subject measured previously, and volume data (B) of the left hippocampal-amygdaloid transition area of the same subject newly measured. For example, the hippocampal function of the subject may be evaluated, by comparing the difference (absolute value) between the volume data (A) and the volume data (B), with a predetermined threshold value. Such threshold value may properly be set in accordance with the negative association between the reference data that represents the volume of the left hippocampal-amygdaloid transition area and the hippocampal function. For example, the evaluation unit 15 evaluates that the hippocampal function of the subject has changed from the previous state, if the difference between the volume data (A) and the volume data (B) is larger than the threshold value, meanwhile evaluates that the hippocampal function of the subject has maintained the previous state, if the difference between the volume data (A) and the volume data (B) is smaller than the threshold value.

The evaluation unit 15 may alternatively evaluate that the hippocampal function of the subject has lowered from the previous state, if the volume data (B) is larger than the volume data (A), meanwhile may evaluate that the hippocampal function of the subject has improved from the previous state, if the volume data (B) is smaller than the volume data (A).

Figure 2:
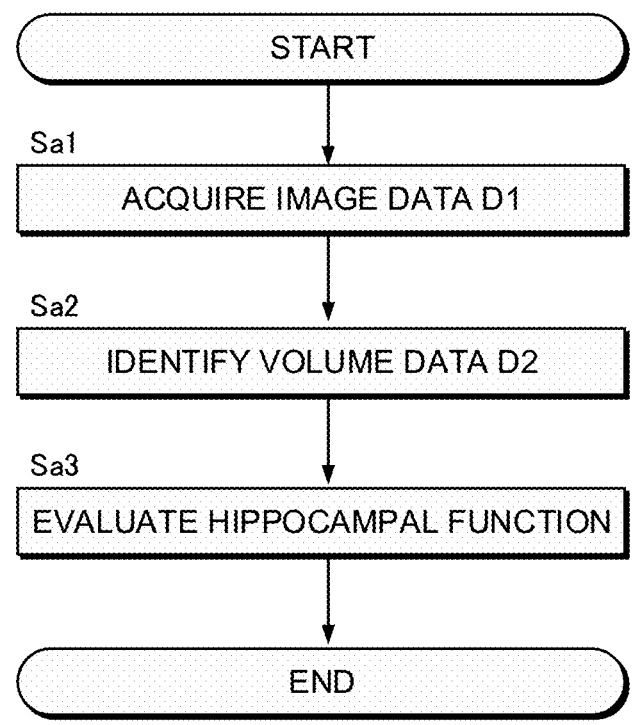
FIG. 2 is a flowchart of a process implemented by the functional evaluation system of hippocampus.

FIG. 2 is a flowchart of a process implemented by the functional evaluation system of hippocampus 100 when the hippocampal function of the subject is evaluated. The process in FIG. 2 starts, typically upon instructed by an administrator of the functional evaluation system of hippocampus 100.

The acquisition unit 11 acquires image data D1 from the storage device 20 (Sa1). The identification unit 13 identifies the volume data D2 that represents the volume of the left hippocampal-amygdaloid transition area of the subject, in accordance with the image data D1 acquired by the acquisition unit 11 (Sa2). The evaluation unit 15 evaluates the hippocampal function of the subject, in accordance with the volume data D2 identified by the identification unit (Sa3). More specifically, the hippocampal function is evaluated, in accordance with the negative association between the volume data D2 identified by the identification unit 13 and the hippocampal function.

Note that the functional evaluation system of hippocampus 100 may also include, for example, a storage unit that stores information regarding the volume of the left hippocampal-amygdaloid transition area, or a display unit that typically displays the volume by hippocampal subfields.

The functional evaluation system of hippocampus 100 of the present invention is applicable to evaluation of the hippocampal function of the subject and relevant mental disease, state of mind, stress level and so forth, in accordance with the volume of the left hippocampal-amygdaloid transition area (left HATA), and excels in objectivity and reliability.

The present invention is also specified as a method for creating data for evaluating the hippocampal function of a subject (referred to as "data creation method", hereinafter).

More specifically, the data creation method includes acquiring the image data D1 that represents the hippocampus of the subject; and identifying the volume data D2 that represents the volume of the left hippocampal-amygdaloid transition area of the subject.

Now, the volume data D2 may be the volume as it is, or may be data obtained by appropriately correcting the volume, as described previously. The data obtained by appropriately correcting the volume typically means various forms of data regarding the volume of the left hippocampal-amygdaloid transition area (numerical values regarding the volume of the left hippocampal-amygdaloid transition area (left HATA), etc.). For example, the hippocampal function of the subject may be evaluated, with use of the volume data D2 identified by the data creation method of the present invention, and in accordance with the negative association (preparatory data D3) between the reference data that represents the volume of the left hippocampal-amygdala transition area (HATA) and the hippocampal function.

The functional evaluation system of hippocampus and the data creation method of the present invention are by no means limited to the aforementioned embodiments.

The present invention is also specified as an evaluation method for evaluating the hippocampal function of a subject. More specifically, the evaluation method acquires the volume data D2, and evaluates the hippocampal function of the subject, in accordance with the volume data D2, and the negative association between the reference data that represents the volume of the left hippocampal-amygdaloid transition area and the hippocampal function. The volume data D2 is acquired by the acquisition unit 11, from the storage device 20.

EXAMPLES

Hereinafter, the present invention will further be detailed below in accordance with example, without being limited thereto.

<1> Selection of Subjects

The subject enrolled were 58 healthy volunteers (mean age: 25±4.4 years, range: 18 to 40 years old, 31 males aged 24.5±3.5, 27 females aged 25.5±5.2). All subjects were right-handed confirmed by the Edinburgh Handedness Inventory (Oldfield, 1971). None of the subjects had any signs or history of neurological or psychological diseases.

<2> Behavioral Memory Task

Presence of a memory circuit in hippocampus has been revealed by a previous report, with use of a lure task established for pattern separation and functional MRI (referred to as fMRI, hereinafter) (Non-Patent Literature 5).

In this study, score of the behavioral memory task and response time were determined without analyzing blood oxygen level dependent (BOLD) signal of fMRI. The behavioral task was assigned according to the methods described typically in Patent Literature 1 and Non-Patent Literature 5, by presenting photographs one by one on a display, and collecting the answer through pressing of any button for each photograph. There were three buttons, and the subjects were requested to judge each picture to be "New", to be "Same" as the picture seen before, and to be "Lure" meaning similar but different, by pressing any button with different fingers (red button for "New" picture, blue button for "Same" picture, and green button for "Lure" picture).

The behavioral paradigm of fMRI employed here relies upon rapid event-related fMRI design in accordance with an explicit three-alternative forced-choice task, including novel stimulus (New), repeated stimulus (Same), and similar stimulus (Lure).

The fully randomized fMRI tasks with 108 trials were configured with 16 sets of similar stimulus (Lure), 16 sets of repetitive stimulus (Same), and 44 items of unrelated novel stimulus (New). The visual stimuli were presented on a head-mounted display for 2500 ms each, at intervals of 0 to 1000 ms, so as to avoid adaptive stimulus response. The visual stimuli were presented to the subjects through a magnetic-field-compatible, head-mounted display with 800×600 resolution (from Resonance Technologies, Inc., Salem, Massachusetts), under computer control with use of Presentation (registered trademark) software (from Neurobehavioral Systems, Inc., Austin, Texas).

Response and response time were recorded in a button box (from Current Designs, Inc., Philadelphia, Pennsylvania). Correct response rates were calculated for the lure task and the same task, and defined as respective scores.

<3> Acquisition of Structural MRI

Anatomical images were acquired with use of a 3-T MRI scanner (Discovery MR750, from GE Medical System, Waukesha, Wisconsin, USA), with a 32-channel head coil and higher order manual shimming for the temporal lobe. Anatomical three-dimensional (3D) T1-weighted images (an example of "image data") were acquired with use of a spoiled gradient recalled echo (SPGR) sequence, with 1 mm thick slices for high resolution (matrix size 256×256, effective field of view 256×256 mm, repetition time 6.9 ms, echo time 3 ms, and flip angle) 15°.

<4> Volumetric Analysis

All T1-weighted and T2-weighted image data were processed with use of freely available software FreeSurfer (http://surfer.nmr.mgh.harvard.edu). A fully automatic reconstruction ("recon-all") function in FreeSurfer 6.0 was used for volumetric segmentation, including motion correction, skull stripping, intensity normalization, white matter segmentation, 3D tessellation of gray/white matter, and surface extraction. The hippocampus was segmented in twelve subfields for each hemisphere, by applying automated analyses of the subfields of the hippocampus, with use of the probabilistic atlas and a modified version of the Van Leemput's algorithm (Van Leemput, et al., 2009). The inventors extracted eleven hippocampal subfields including hippocampal tail, subiculum, presubiculum, parasubiculum, Ammon's horns (CA)1, CA3, CA4, dentate gyrus granule cell layer (GC-DG), hippocampal molecular layer, hippocampal-amygdaloid transition area (HATA), and hippocampal fimbria. Only eleven hippocampal subfields, excluding hippocampal fissure, were segmented since the hippocampal fissure has been considered to be poorly reproducible.

Figure 3:
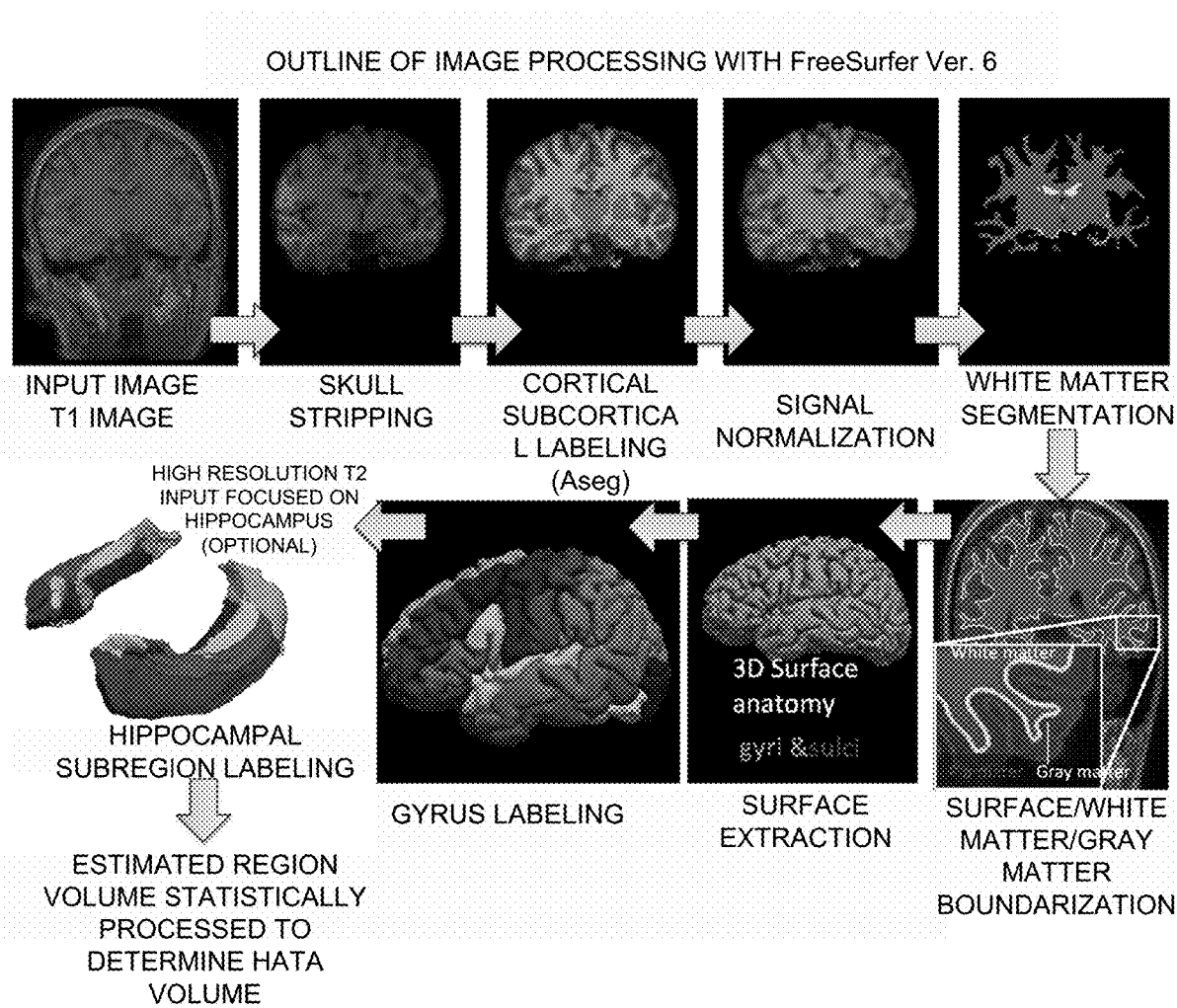
FIG. 3 contains views regarding an outline of volume identification of hippocampal subfield.
Figure 4:
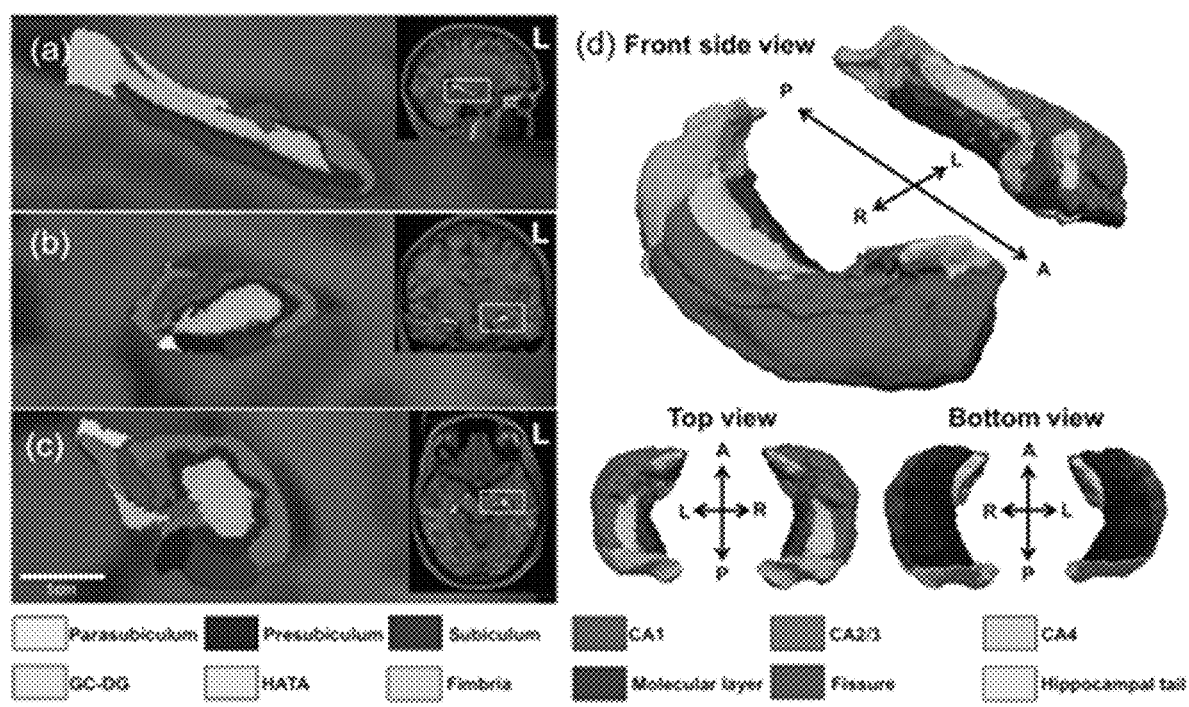
FIG. 4 contains views regarding hippocampus and a peri-hippocampal area of a healthy person, containing sagital (a), coronal (b), axial (c), and 3D views (d), with the subfields (parasubiculum, presubiculum, subiculum, Ammon's horns (CA) 1, CA2/3, CA4, dentate gyrus granule cells (GC-DG), hippocampal-amygdaloid transition area (HATA), hippocampal fimbria, hippocampal molecular layer, hippocampal fissure, and hippocampal tail) respectively indicated by colors (yellow, deep purple, blue, red, green, gray, light blue, light green, pink, brown, purple, and light purple), and with notations A: anterior; P: posterior; L: left; and R: right.

From the above reasons, the present inventors analyzed the volume of eleven hippocampal subfields (an example of "volume data"), according to the procedures illustrated in FIG. 3, for the purpose of evaluating only the brain structure (FIG. 4).

Total intracranial volume (TIV) estimated by FreeSurfer 6.0 was then adopted for brain volume correction.

<5> Statistical Analysis

Continuous variables except for age and Same score, analyzed by the Kolmogrov-Smirnov test, demonstrated p>0.05 indicating normal distribution. Gender difference was analyzed by the Welch t test, and the age and the Same score were analyzed by the Mann-Whitney U test.

In order to find gender differences in the volumes for the whole hippocampus and each of the eleven hippocampal subfields, the present inventors applied an analysis of covariance (ANCOVA) with TIV and age added as covariates.

<6> Results

There were no gender differences found by fMRI in the hippocampal task score and the response time, as proven by gender distribution of the subjects (Chi-square test, p=0.6), age (Mann-Whitney U test, t=0.48), Lure task score and response time (Welch t-test, p=0.49, p=0.62), Same task score (Mann-Whitney U test, p=0.65), and reaction time (Welch t-test, p=0.65, p=0.6) (Table 1).

TABLE 1

|  | male mean | female mean | statistic value | p value |  |
|---|---|---|---|---|---|
| n | 31 | 27 | 0.28 † | 0.60 | n.s |
| Age (years) | 24.5 (3.5) | 25.5 (5.2) | 373.0 ‡ | 0.48 | n.s |
| Lure score (%) | 49.9 (21.3) | 50.3 (14.2) | −0.07 | 0.95 | n.s |
| Same score (%) | 89.7 (10.2) | 88.3 (10.7) | 447.5 ‡ | 0.65 | n.s |
| Lure response time (sec) | 1.40 (0.17) | 1.4 (0.25) | 0.15 | 0.89 | n.s |
| Same response time (sec) | 1.21 (0.17) | 1.2 (0.23) | 0.06 | 0.95 | n.s |

Note,
data expressed as mean ± standard deviation (SD), the number of subjects (n) and not significant (n.s).
Chi-square test †, Mann-whitney U test ‡, Welch t-test.

Figure 9:
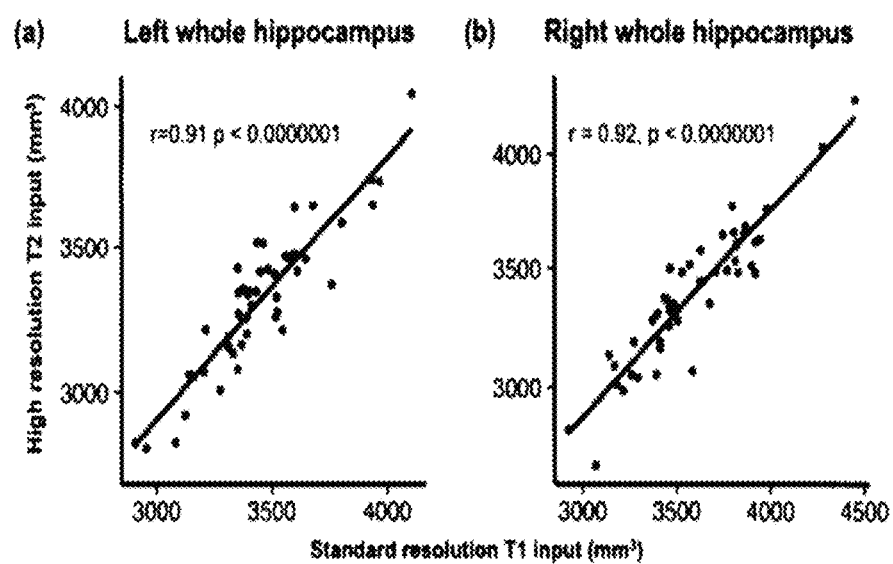
FIG. 9 contains scatter plots (a to b) regarding segmented brain areas, namely Left whole hippocampus (plot a) and Right whole hippocampus (plot b), with regard to Table 2.

FIG. 9 contains scatter plots (a to b) regarding segmented brain areas, namely Left whole hippocampus (plot a) and Right whole hippocampus (plot b), with regard to Table 2. Average values and SD values, among the subjects, of the volumes ($mm^3$) of the whole hippocampus and the individual subfields were summarized, while itemized by bilateral hippocampus, right hippocampus, left hippocampus, and asymmetry index (AI, in %)(Table 2).

TABLE 2

Table. Peason's correlation coefficient between T1 and T2

|  | Left volume | | | Right volume | | |
|---|---|---|---|---|---|---|
|  | r | (95% CI) | P | r | (95% CI) | P |
| whole hippocampus | 0.91 | (0.85, 0.95) | <0.000001 | 0.92 | (0.86, 0.96) | <0.000001 |
| subiculum | 0.86 | (0.75, 0.92) | <0.000001 | 0.84 | (0.73, 0.91) | <0.000001 |
| presubiculum | 0.79 | (0.65, 0.88) | <0.000001 | 0.76 | (0.60, 0.86) | <0.000001 |
| parasubiculum | 0.51 | (0.26, 0.69) | <0.000001 | 0.65 | (0.45, 0.79) | <0.000001 |
| Hippocampal tail | 0.68 | (0.49, 0.81) | <0.000001 | 0.65 | (0.45, 0.79) | <0.000001 |
| molecular layer | 0.62 | (0.41, 0.77) | <0.000001 | 0.67 | (0.48, 0.81) | <0.000001 |
| GC-DG | 0.75 | (0.59, 0.85) | <0.000001 | 0.68 | (0.49, 0.81) | <0.000001 |
| CA1 | 0.61 | (0.68, 0.89) | <0.000001 | 0.89 | (0.81, 0.94) | <0.000001 |
| CA2/3 | 0.70 | (0.52, 0.83) | <0.000001 | 0.69 | (0.51, 0.82) | <0.000001 |
| CA4 | 0.71 | (0.53, 0.83) | <0.000001 | 0.59 | (0.37, 0.75) | <0.000001 |
| fimbria | 0.47 | (0.21, 0.67) | 0.0009 | 0.41 | (0.14, 0.62) | 0.0046 |
| HATA | 0.69 | (0.51, 0.82) | <0.000001 | 0.58 | (0.35, 0.74) | <0.000001 |

Note
scatter plots indicates whole hippocampus volume estimated on high-resolution T2 inp-t vs standard-resolution T1 input 47 young healthy subjects (mean age 25.0 ± 4.7 years, 22 makes, 25 females). The solid line represents a linear approximation and 95% confidence interval for regression line shaded gray. Whole hippocampus and subfield volumes estimated by Freesurfer 6 with high-resolution T2 and standard-resolution T1, showed significant correlation in all area.
r, pearson's correlation coefficient;
95% CI, 95% confidence interval;
P, P value.
GC-DC, granule cell layer of dentate gyrus;
CA, Cornu Ammonis;
HATA, hippocampal-amygdaloid transition area.

All statistical analyses were conducted at the α level with p=0.05, with use of a graphical user interface EZR (Saitama Medical Center, Jichi Medical University) for R (The R Foundation for Statistical Computing). More precisely, EZR is a modified version of the R commander, and is designed to include statistical functions often used in biostatistics.

AI is given by {(right volume−left volume)/(right volume+left volume)}×100, in percentage, where "0" value indicates that the right and left volumes are same, minus value indicates that the left volume is larger, and plus value indicates that the right volume is larger. Referring to the AI, the hippocampal volume tends to be larger in the right side except for presubiculum and parasubiculum, demonstrating differences of fimbria (11.6%), parasubiculum (10.9%), HATA (6.1%), hippocampal-tail (5.6%), CA2/3 (5.4%), presubiculum (5%), CA1 (4.4%), subiculum (3.8%), CA4 (3.8%), DG (3.5%), molecular-layer (3.4%), and total hippocampal volume (2.8%), in descending order.

Comparison between males and females in the whole hippocampal volume and the subfield volumes revealed that the volumes of the left DG and the left fimbria in men were significantly larger than those in women (ANCOVA adjusted age and TIV, left DG: p=0.014, left fimbria: p=0.025) (Table 3).

TABLE 3

| Left volume | male (n = 31, 24.5y ± 3.5) | | female (n = 27, 25.5y ± 5.2) | |
|---|---|---|---|---|
| | mean mm$^3$ (95% CI; SD) | Vol/TIV 10$^4$ (95% CI; SD) | mean mm$^3$ (95% CI; SD) | Vol/TIV 10$^4$ (95% CI; SD) |
| whole hippocampus | 3624.9 (3526.3, 3723.5; 268.8) | 21.44 (20.77, 22.11; 1.83) | 3387.6 (3291.7, 3483.5; 242.4) | 22.45 (21.85, 23.05; 1.51) |
| subiculum | 456.8 (438.7, 474.8; 49.3) | 2.70 (2.59, 2.82; 0.32) | 433.6 (419.7, 447.5; 35.1) | 2.88 (2.77, 2.98; 0.26) |
| presubiculum | 328.1 (315.9, 340.2; 33.1) | 1.94 (1.86, 2.02; 0.22) | 315.5 (305.1, 325.9; 26.2) | 2.09 (2.01, 2.17; 0.20) |
| parasubiculum | 57.9 (54.0, 61.8; 10.7) | 0.34 (0.32, 0.37; 0.07) | 56.2 (51.9, 60.5; 10.8) | 0.37 (0.34, 0.40; 0.08) |
| Hippocampal tail | 583.7 (550.9, 616.4; 89.2) | 3.45 (3.24, 3.66; 0.57) | 578.0 (547.7, 608.2; 76.5) | 3.83 (3.64, 4.02; 0.48) |
| molecular layer | 597.0 (580.2, 613.9; 45.9) | 3.53 (3.42, 3.64; 0.31) | 557.4 (539.8, 575.0; 44.4) | 3.69 (3.59, 3.80; 0.27) |
| GC-DG * | 313.1 (304.2, 322.0; 24.3) | 1.85 (1.79, 1.92; 0.17) | 281.9 (273.4, 290.5; 21.7) | 1.87 (1.81, 1.93; 0.14) |
| CA1 | 662.9 (642.1, 683.8; 56.8) | 3.92 (3.79, 4.05; 0.37) | 612.3 (587.3, 637.3; 63.2) | 4.05 (3.91, 4.19; 0.35) |
| CA2/3 | 209.3 (201.0, 217.6; 22.6) | 1.24 (1.19, 1.29; 0.13) | 186.9 (178.9, 194.9; 20.2) | 1.24 (1.19, 1.28; 0.11) |
| CA4 | 264.2 (255.9, 272.5; 22.6) | 1.56 (1.51, 1.62; 0.15) | 239.9 (232.2, 247.5; 19.3) | 1.59 (1.54, 1.64; 0.12) |
| fimbria * | 89.7 (83.2, 96.2; 17.8) | 0.53 (0.49, 0.57; 0.10) | 72.0 (65.3, 78.6; 16.8) | 0.48 (0.43, 0.53; 0.12) |
| HATA | 62.4 (59.4, 65.3; 8.0) | 0.37 (0.35, 0.38; 0.04) | 54.0 (51.1, 56.9; 7.3) | 0.36 (0.34, 0.38; 0.05) |

| Right volume | male | | female | |
|---|---|---|---|---|
| | mean mm$^3$ (95% CI; SD) | Vol/TIV 10$^4$ (95% CI; SD) | mean mm$^3$ (95% CI; SD) | Vol/TIV 10$^4$ (95% CI; SD) |
| whole hippocampus | 3781.9 (3651.3, 3912.5; 356.1) | 22.35 (21.58, 23.11; 2.09) | 3510.0 (3400.8, 3619.2; 276.0) | 23.29 (22.46, 24.12; 2.10) |
| subiculum | 474.5 (454.3, 494.7; 55.1) | 2.81 (2.68, 2.94; 0.35) | 435.9 (419.0, 452.8; 42.8) | 2.89 (2.76, 3.03; 0.34) |
| presubiculum | 324.6 (309.6, 339.7; 41.1) | 1.92 (1.83, 2.00; 0.23) | 302.5 (290.4, 314.6; 30.5) | 2.01 (1.91, 2.11; 0.26) |
| parasubiculum | 58.7 (54.5, 63.0; 11.5) | 0.35 (0.32, 0.37; 0.06) | 52.1 (48.7, 55.4; 8.5) | 0.35 (0.32, 0.37; 0.06) |
| Hippocampal tail | 616.0 (587.9, 644.2; 76.7) | 3.64 (3.46, 3.83; 0.50) | 586.7 (559.4, 613.9; 68.9) | 3.89 (3.70, 4.08; 0.47) |
| molecular layer | 624.6 (601.6, 647.7; 62.9) | 3.69 (3.55, 3.83; 0.38) | 581.2 (561.9, 600.4; 48.6) | 3.86 (3.71, 4.00; 0.36) |
| GC-DG | 326.1 (314.4, 337.8; 31.9) | 1.93 (1.86, 1.99; 0.18) | 300.9 (291.4, 310.4; 24.0) | 2.00 (1.93, 2.06; 0.16) |
| CA1 | 696.5 (667.2, 725.8; 79.8) | 4.21 (3.94, 4.29; 0.47) | 641.6 (618.8, 664.3; 57.4) | 4.26 (4.09, 4.42; 0.42) |
| CA2/3 | 228.4 (217.3, 239.6; 30.4) | 1.35 (1.29, 1.41; 0.16) | 211.9 (202.2, 221.6; 24.5) | 1.40 (1.34, 1.46; 0.15) |
| CA4 | 273.6 (263.7, 283.5; 27.1) | 1.62 (1.56, 1.67; 0.15) | 256.5 (247.8, 265.2; 22.1) | 1.70 (1.64, 1.76; 0.15) |
| fimbria | 91.9 (83.4, 100.4; 23.3) | 0.54 (0.49, 0.59; 0.13) | 81.6 (76.5, 86.8; 13.0) | 0.54 (0.51, 0.58; 0.09) |
| HATA | 66.8 (63.0, 70.5; 10.3) | 0.39 (0.37, 0.42; 0.06) | 59.2 (56.4, 62.0; 7.1) | 0.39 (0.37, 0.41; 0.05) |

Note.
Values are mean ± standard deviation (SD) of estimated volume (mm$^3$). ANCOVA results with TIV and age as a covariate. Data expressed as * P < 0.05, n.s; not significant. GC-DG, granule cell layer-dentate gyrus; CA, Cornu Ammonis; HATA, hippocampal amygdala transition area; TIV, total intracranial volume. left GC-DG and left Fimbria volumes is larger in male subjects than in female subjects (P = 0.010, P = 0.023).

The volumes of the left DG and the left fimbria were, however, not found to significantly correlate with the Lure score and the Same score (Table 4. Lure; left DG: r=−0.08, p=0.57, loft fimbria: r=−0.08, p=0.54. Same; left DG: r=−0.07, p=0.61, loft fimbria: r=−0.08, p=0.98). Only the left HATA demonstrated correlation with the Lure score, in the simple regression analysis.

TABLE 4

| | Lure correct response rate | | | | | Same correct response rate | | | | |
|---|---|---|---|---|---|---|---|---|---|---|
| | β | 95% CI | t | P | P * | β | 95% CI | t | P | P * |
| Bilateral volume | | | | | | | | | | |
| whole hippocampus | −0.16 | (−0.43, 0.10) | −1.26 | 0.21 | 1.00 | 0.01 | (−0.25, 0.28) | 0.11 | 0.91 | 1.00 |
| subiculum | −0.11 | (−0.38, 0.15) | −0.86 | 0.40 | 1.00 | −0.02 | (−0.28, 0.25) | −0.12 | 0.91 | 1.00 |
| presubiculum | −0.17 | (−0.44, 0.09) | −1.32 | 0.19 | 1.00 | 0.04 | (−0.23, 0.30) | 0.26 | 0.79 | 1.00 |
| parasubiculum | 0.03 | (−0.24, 0.30) | 0.24 | 0.81 | 1.00 | −0.05 | (−0.32, 0.22) | −0.38 | 0.71 | 1.00 |
| Hippocampal tail | 0.02 | (−0.25, 0.29) | 0.16 | 0.87 | 1.00 | −0.10 | (−0.37, 0.16) | −0.77 | 0.44 | 1.00 |
| molecular layer | −0.19 | (−0.45, 0.07) | −1.46 | 0.15 | 1.00 | 0.02 | (−0.24, 0.29) | 0.18 | 0.86 | 1.00 |
| GC-DG | −0.17 | (−0.44, 0.09) | −1.32 | 0.19 | 1.00 | 0.02 | (−0.25, 0.29) | 0.16 | 0.88 | 1.00 |
| CA1 | −0.22 | (−0.49, 0.04) | −1.73 | 0.09 | 1.00 | 0.11 | (−0.15, 0.38) | 0.84 | 0.40 | 1.00 |
| CA2/3 | −0.15 | (−0.42, 0.11) | −1.15 | 0.26 | 1.00 | 0.06 | (−0.21, 0.32) | 0.42 | 0.68 | 1.00 |
| CA4 | −0.14 | (−0.40, 0.13) | −1.05 | 0.30 | 1.00 | 0.01 | (−0.26, 0.28) | 0.08 | 0.94 | 1.00 |
| fimbria | −0.20 | (−0.46, 0.07) | −1.49 | 0.14 | 1.00 | 0.06 | (−0.20, 0.33) | 0.48 | 0.64 | 1.00 |
| HATA | −0.24 | (−0.50, 0.02) | −1.87 | 0.07 | 1.00 | 0.04 | (−0.23, 0.31) | 0.29 | 0.78 | 1.00 |

TABLE 4-continued

|  | Lure correct response rate | | | | | Same correct response rate | | | | |
|---|---|---|---|---|---|---|---|---|---|---|
|  | β | 95% CI | t | P | P* | β | 95% CI | t | P | P* |
| Left volume | | | | | | | | | | |
| whole hippocampus | 0.16 | (−0.42, 0.11) | −1.19 | 0.24 | 1.00 | −0.05 | (−0.32, 0.22) | −0.37 | 0.71 | 1.00 |
| subiculum | −0.10 | (−0.37, 0.16) | −0.77 | 0.45 | 1.00 | −0.03 | (−0.30, 0.24) | −0.21 | 0.84 | 1.00 |
| presubiculum | −0.20 | (−0.46, 0.07) | −1.49 | 0.14 | 1.00 | −0.01 | (−0.27, 0.26) | −0.04 | 0.97 | 1.00 |
| perasubiculum | 0.03 | (−0.23, 0.30) | 0.25 | 0.80 | 1.00 | −0.06 | (−0.33, 0.20) | −0.47 | 0.84 | 1.00 |
| Hippocampal tail | −0.01 | (−0.28, 0.25) | −0.11 | 0.91 | 1.00 | −0.15 | (−0.42, 0.11) | −1.15 | 0.25 | 1.00 |
| molecular layer | −0.16 | (−0.43, 0.10) | −1.22 | 0.23 | 1.00 | −0.03 | (−0.29, 0.24) | −0.20 | 0.84 | 1.00 |
| GC-DG | −0.11 | (−0.37, 0.16) | −0.82 | 0.42 | 1.00 | −0.02 | (−0.29, 0.25) | −0.15 | 0.89 | 1.00 |
| CA1 | −0.19 | (−0.46, 0.07) | −1.49 | 0.14 | 1.00 | 0.02 | (−0.25, 0.29) | 0.14 | 0.89 | 1.00 |
| CA2/3 | −0.13 | (−0.39, 0.14) | −0.97 | 0.34 | 1.00 | 0.01 | (−0.26, 0.27) | 0.05 | 0.96 | 1.00 |
| CA4 | −0.06 | (−0.33, 0.20) | −0.48 | 0.63 | 1.00 | 0.01 | (−0.26, 0.28) | 0.07 | 0.95 | 1.00 |
| fimbria | −0.11 | (−0.38, 0.15) | 0.85 | 0.40 | 1.00 | 0.04 | (−0.22, 0.31) | 0.33 | 0.74 | 1.00 |
| HATA | −0.28 | (−0.54, −0.02) | −2.18 | 0.03 * | 1.00 | 0.03 | (−0.24, 0.30) | 0.21 | 0.83 | 1.00 |
| Right volume | | | | | | | | | | |
| whole hippocampus | −0.16 | (−0.42, 0.11) | −1.21 | 0.23 | 1.00 | 0.07 | (−0.20, 0.33) | 0.49 | 0.63 | 1.00 |
| subiculum | −0.11 | (−0.38, 0.16) | −0.83 | 0.41 | 1.00 | 0.00 | (−0.27, 0.28) | −0.03 | 0.98 | 1.00 |
| presubiculum | −0.12 | (−0.39, 0.14) | −0.93 | 0.36 | 1.00 | 0.06 | (−0.21, 0.33) | 0.46 | 0.65 | 1.00 |
| parasubiculum | 0.02 | (−0.25, 0.29) | 0.14 | 0.89 | 1.00 | −0.02 | (−0.29, 0.25) | −0.15 | 0.88 | 1.00 |
| Hippocampal tail | 0.06 | (−0.21, 0.33) | 0.44 | 0.66 | 1.00 | −0.03 | (−0.30, 0.24) | −0.24 | 0.82 | 1.00 |
| molecular layer | −0.19 | (−0.46, 0.07) | −1.47 | 0.15 | 1.00 | 0.06 | (−0.20, 0.33) | 0.47 | 0.64 | 1.00 |
| GC-DG | −0.21 | (−0.47, 0.05) | −1.61 | 0.11 | 1.00 | 0.05 | (−0.21, 0.32) | 0.41 | 0.69 | 1.00 |
| CA1 | −0.21 | (−0.47, 0.05) | −1.62 | 0.11 | 1.00 | 0.17 | (−0.09, 0.44) | 1.32 | 0.19 | 1.00 |
| CA2/3 | −0.14 | (−0.41, 0.12) | −1.09 | 0.28 | 1.00 | 0.09 | (−0.18, 0.35) | 0.65 | 0.52 | 1.00 |
| CA4 | −0.19 | (−0.45, 0.08) | −1.41 | 0.16 | 1.00 | 0.01 | (−0.26, 0.28) | 0.08 | 0.94 | 1.00 |
| fimbria | −0.23 | (−0.49, 0.03) | −1.79 | 0.08 | 1.00 | 0.07 | (−0.20, 0.34) | 0.51 | 0.61 | 1.00 |
| HATA | −0.17 | (−0.43, 0.10) | −1.27 | 0.21 | 1.00 | 0.04 | (−0.23, 0.31) | 0.30 | 0.76 | 1.00 |

Note,
simple linear regression analysis was performed between memory task score (correct response rate of lure task and same task) and whole hippocampus or each subfield volumes. β indicates standard partial regression coefficient; 95% CI, confidence interval; t-value; P, P-value; P$^d$, The values were corrected by Benjamini-Krieger-Yekutieli's method for multiple comparisons; *, p < 0.05; **, p < 0.01. GC-DG, granule cell layer of dentate gyrus; CA, Cornu Ammonis; HATA, hippocampal-amygdaloid transition area. Only the left HATA indicated significant negative association with the lure correct response rate (P = 0.03).

Simple correlation of the memory score with the whole hippocampus and the subfield volume, and the results after multiple regression analysis were summarized, while itemized by bilateral hippocampus, left hippocampus, and right hippocampus (Table 5). Only the left HATA demonstrated correlation with the Lure score, in the multiple regression analysis.

TABLE 5

| | | Lure correct response rate | | | | | Same correct response rate | | | | |
|---|---|---|---|---|---|---|---|---|---|---|---|
| Right volume | | β | 95% CI | t | P | P* | β | 95% CI | t | P | P* |
| | whole hippocampus | −0.05 | (−0.36, 0.25) | −0.36 | 0.72 | 1.00 | −0.07 | (−0.39, 0.24) | −0.48 | 0.63 | 1.00 |
| | TIV | −0.41 | (−0.78, −0.05) | 2.29 | 0.03 * | 0.12 | 0.39 | (0.02, 0.76) | 2.09 | 0.04 * | 0.17 |
| | age | 0.05 | (−0.21, 0.32) | 0.41 | 0.68 | 1.00 | −0.06 | (−0 33, 0.20) | −0.49 | 0.63 | 1.00 |
| | gender | −0.28 | (−0.62, 0.06) | −1.67 | 0.10 | 0.37 | 0.15 | (−0.19, 0.50) | 0.89 | 0 38 | 1.00 |
| | subiculum | −0.06 | (−0.35, 0.22) | −0.45 | 0.65 | 1.00 | −0.08 | (−0.37, 0.20) | −0.58 | 0.56 | 1.00 |
| | TIV | −0.43 | (−0.77, −0.09) | −2.51 | 0.02 * | 0.12 | 0.37 | (0.02, 0.72) | 2.14 | 0.04 * | 0.17 |
| | age | 0.05 | (−0.21, 0.31) | 0.41 | 0.68 | 1.00 | −0.07 | (−0 33, 0.20) | −0.49 | 0 63 | 1.00 |
| | gender | −0.29 | (−0.63, 0.05) | −1.70 | 0.10 | 0.37 | 0.14 | (−0 21, 0.49) | 0.81 | 0.42 | 1.00 |
| | presubiculum | −0.06 | (−0.33, 0.22) | −0.41 | 0.69 | 1.00 | 0.02 | (−0.30, 0.26) | 0.14 | 0.89 | 1.00 |
| | TIV | −0.42 | (−0.77, −0.08) | −2.47 | 0.02 * | 0.12 | 0.36 | (0.01, 0.71) | 2.04 | 0.06 * | 0.17 |
| | age | 0.05 | (−0.21, 0.31) | 0.38 | 0.71 | 1.00 | −0.07 | (−0.34, 0.20) | −0.53 | 0.60 | 1.00 |
| | gender | −0.28 | (−0.62, 0.06) | −1.67 | 0.10 | 0.37 | 0.16 | (−0.19, 0.50) | 0.92 | 0.36 | 1.00 |
| | parasubiculum | 0.15 | (−0.13, 0.44) | 1.07 | 0.29 | 1.00 | −0.15 | (−0.44, 0.14) | −1.03 | 0.31 | 1.00 |
| | TIV | −0.50 | (−0.85, −0.15) | −2.86 | 0.01 ** | 0.12 | 0.41 | (0.05, 0.77) | 2.30 | 0.03 * | 0.17 |
| | age | 0.04 | (−0.22, 0.30) | 0.33 | 0.74 | 1.00 | 0.06 | (−0.33, 0.20) | −0.47 | 0 64 | 1.00 |
| | gender | −0.26 | (−0.60, 0.07) | −1.59 | 0.12 | 0.37 | 0.15 | (−0.19, 0.49) | 0.89 | 0.38 | 1.00 |
| | Hippocampal tail | 0.14 | (−0.13, 0.41) | 1.05 | 0.30 | 1.00 | −0.11 | (−0.38, 0.17) | −0.76 | 0.45 | 1.00 |
| | TIV | −0.48 | (−0.82, −0.14) | 2.82 | 0.01 ** | 0.12 | 0.38 | (0.03, 0.73) | 2.19 | 0.03 * | 0.17 |
| | age | 0.03 | (−0.23, 0.29) | 0.25 | 0.80 | 1.00 | −0.06 | (−0.32, 0.21) | −0.43 | 0.67 | 1.00 |
| | gender | −0.27 | (−0.60, 0.06) | −1.62 | 0.11 | 0.37 | 0.16 | (−0.19, 0.50) | 0.92 | 0.36 | 1.00 |
| | molecular layer | 0.11 | (−0.40, 0.19) | −0.73 | 0.47 | 1.00 | 0.06 | (−0.36, 0.24) | −0.41 | 0.69 | 1.00 |
| | TIV | −0.39 | (−0.75, −0.04) | −2.22 | 0.03 * | 0.12 | 0.38 | (0.01, 0.74) | 2.08 | 0.04 * | 0.17 |
| | age | 0.06 | (−0.20, 0.32) | 0.43 | 0.67 | 1.00 | −0.67 | (−0.33, 0.20) | −0.50 | 0.62 | 1.00 |
| | gender | −0.29 | (−0.62, 0.05) | −1.70 | 0.09 | 0.37 | 0.16 | (−0.19, 0.50) | 0.90 | 0.37 | 1.00 |
| | GC-DG | −0.11 | (−0.43, 0.21) | −0.69 | 0.49 | 1.00 | −0.12 | (−0.45, 0.21) | −0.74 | 0.46 | 1.00 |
| | TIV | −0.38 | (−0.76, −0.01) | −2.04 | 0.06 * | 0.14 | 0.42 | (0.03, 0.80) | 2.18 | 0.03 * | 0.17 |
| | age | 0.06 | (−0.20, 0.32) | 0.46 | 0.65 | 1.00 | −0.06 | (−0.33, 0.21) | −0.44 | 0.66 | 1.00 |
| | gender | −0.28 | (−0.62, 0.05) | −1.69 | 0.10 | 0.37 | 0.15 | (−0.19, 0.49) | 0.88 | 0 38 | 1.00 |

TABLE 5-continued

| Right volume | Lure correct response rate | | | | | Same correct response rate | | | | |
|---|---|---|---|---|---|---|---|---|---|---|
| | β | 95% CI | t | P | P * | β | 95% CI | t | P | P * |
| CA1 | −0.13 | (−0.43, 0.17) | −0.88 | 0.38 | 1.00 | 0.08 | (−0.22, 0.38) | 0.53 | 0.60 | 1.00 |
| TIV | −0.38 | (−0.74, −0.03) | −2.16 | 0.04 * | 0.12 | 0.32 | (−0.05, 0.68) | 1.75 | 0.09 | 0.27 |
| age | 0.05 | (−0.21, 0.31) | 0.40 | 0.69 | 1.00 | 0.07 | (−0.34, 0.19) | −0.53 | 0.60 | 1.00 |
| gender | −0.29 | (−0.62, 0.05) | −1.72 | 0.09 | 0.37 | 0.17 | (−0.17, 0.51) | 0.99 | 0.33 | 1.00 |
| CA2/3 | 0.00 | (−0.31, 0.30) | −0.03 | 0.97 | 1.00 | −0.06 | (−0.36, 0.25) | −0.36 | 0.72 | 1.00 |
| IIV | −0.44 | (−0.81, −0.06) | −2.35 | 0.02 * | 0.12 | 0.38 | (0.00, 0.76) | 2.02 | 0.05 * | 0.17 |
| age | 0.05 | (−0.21, 0.31) | 0.39 | 0.70 | 1.00 | −0.07 | (−0.33, 0.20) | −0.50 | 0.62 | 1.00 |
| gender | −0.28 | (−0.61, 0.06) | −1.63 | 0.11 | 0.37 | 0.16 | (−0.18, 0.51) | 0.96 | 0.34 | 1.00 |
| CA4 | −0.08 | (−0.38, 0.23) | −0.51 | 0.61 | 1.00 | −0.15 | (−0.46, 0.16) | −0.99 | 0.33 | 1.00 |
| IIV | −0.40 | (−0.77, −0.03) | −2.18 | 0.03 * | 0.12 | 0.43 | (0.06, 0.80) | 2.30 | 0.03 * | 0.17 |
| age | 0.06 | (−0.20, 0.32) | 0.46 | 0.65 | 1.00 | −0.05 | (−0.32, 0.22) | −0.38 | 0.71 | 1.00 |
| gender | −0.28 | (−0.61, 0.06) | −1.65 | 0.10 | 0.37 | 0.16 | (−0.18, 0.50) | 0.93 | 0.36 | 1.00 |
| fimbria | −0.16 | (−0.44, 0.12) | −1.16 | 0.25 | 1.00 | −0.03 | (−0.31, 0.26) | −0.19 | 0.85 | 1.00 |
| TIV | −0.38 | (−0.73, −0.04) | −2.21 | 0.03 * | 0.12 | 0.36 | (0.00, 0.72) | 2.03 | 0.05 * | 0.17 |
| age | 0.05 | (−0.21, 0.31) | 0.40 | 0.69 | 1.00 | −0.07 | (−0.34, 0.20) | −0.53 | 0.60 | 1.00 |
| gender | −0.28 | (−0.61, 0.05) | −1.69 | 0.10 | 0.37 | 0.16 | (−0.18, 0 50) | 0.94 | 0.35 | 1.00 |
| HATA | −0.09 | (−0.39, 0.21) | −1.71 | 0.54 | 1.00 | −0.08 | (−0.39, 0.23) | 0.53 | 0.60 | 1.00 |
| TIV | −0.40 | (−0.76, −0.05) | −2.29 | 0.03 * | 0.12 | 0.38 | (0.02, 0.74) | 2.13 | 0.04 * | 0.17 |
| age | 0.06 | (−0.20, 0.32) | 0.47 | 0.64 | 1.00 | −0.06 | (−0.33, 0.21) | −0.45 | 0.66 | 1.00 |
| gender | −0.29 | (−0.63, 0.05) | −1.71 | 0.09 | 0.37 | 0.15 | (−0.20, 0.49) | 0.86 | 0.40 | 1.00 |

Note.
the model in multiple regression analysis was analyzed memory task score (correct response rate of lure task and same task) as the dependent variable and whole hippocampus or subfield volume. TIV, age and gender as the explanatory variable. β indicates standard partial regression coefficient: 95% CI, confidence interval: t, t-value; P. P-value; $P^a$, The values were corrected by Benjamini-Krieger-Yekutieli's method for multiple comparisons; *, p < 0.05; **, p < 0.01. GC-DG. granule cell layer of dentate gyrus: CA. Cornu Ammonis: HATA, hippocampal-amygdaloid transition area. There was no significant causal association with memory task in all areas.

Figure 5:
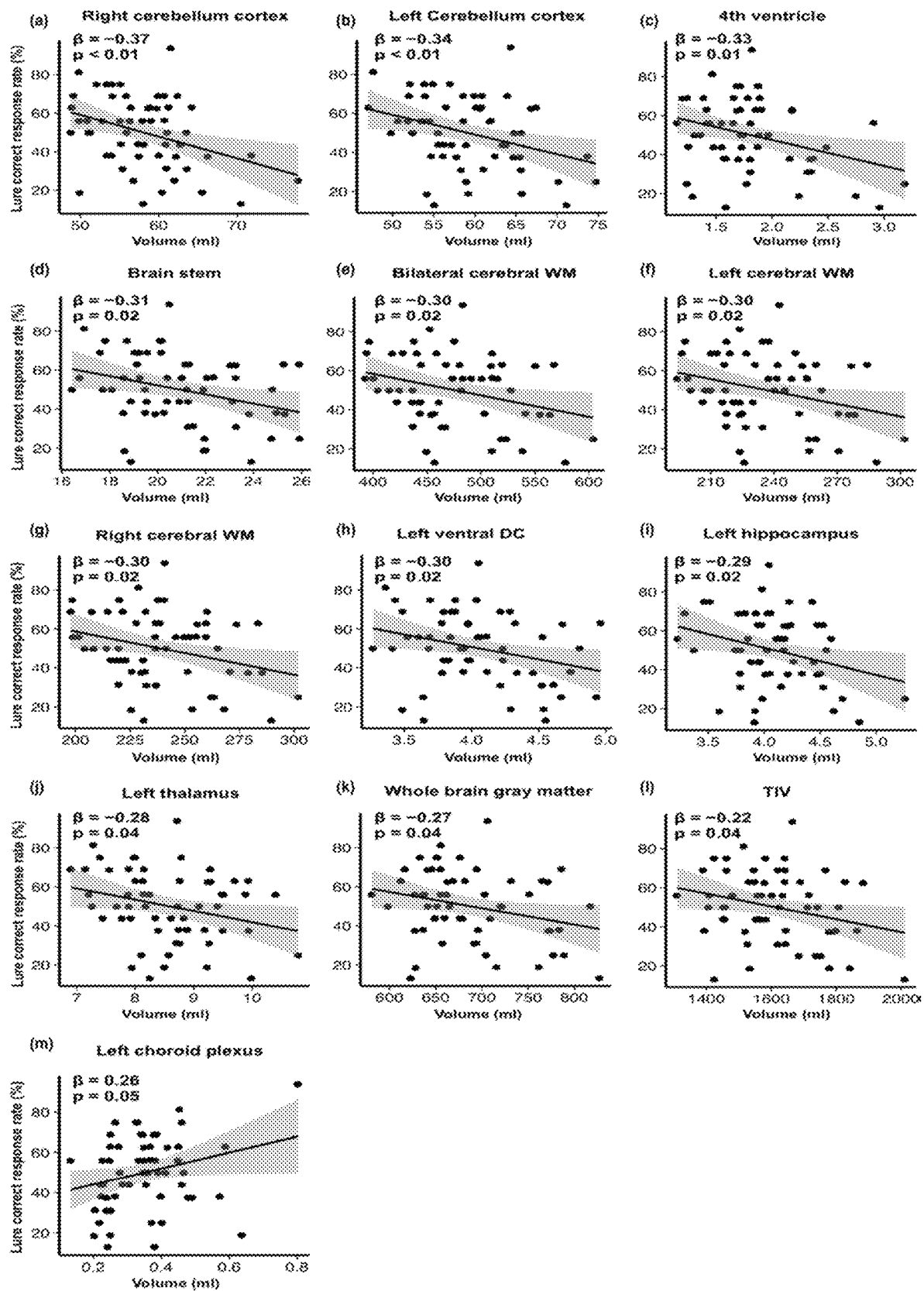
FIG. 5 contains scatter plots (a to m) regarding segmented brain areas that demonstrate significant association with a lure task, based on analytical results obtained from 57 healthy subjects. The areas that demonstrated negative association with the lure correct response rate were (k) whole brain gray matter, (e) bilateral cerebral white matter, (d) brain stem, (c) 4th ventricle, (a) right cerebellum cortex, (b) left cerebellum cortex, (i) left hippocampus, (j) left thalamus, and (h) left ventral diencephalon. Positive association was observed in (m) left choroid plexus.
Figure 6:
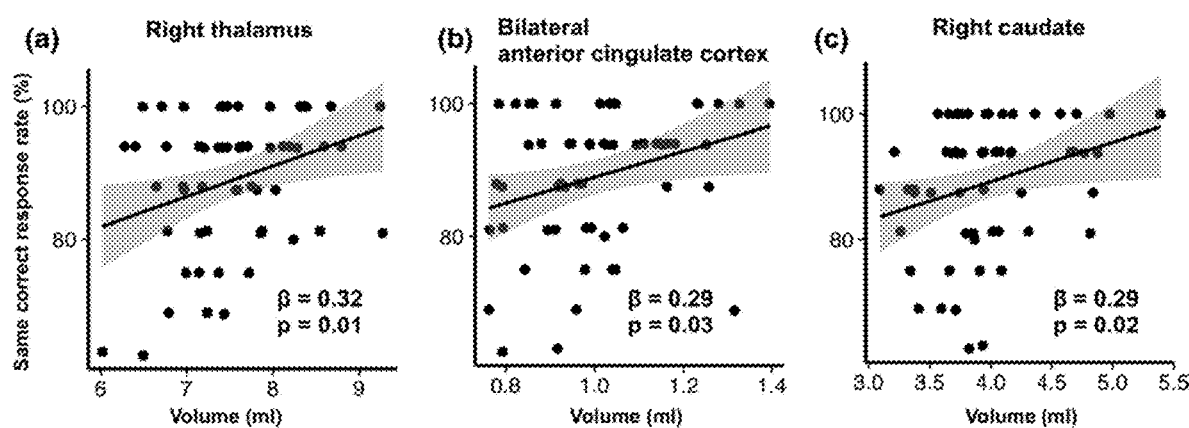
FIG. 6 contains scatter plots (a to c) regarding segmented brain areas that demonstrate significant association with a Same task. Positive association was observed in (a) right thalamus, (b) bilateral anterior cingulate cortex, and (c) right caudate.

Referring to the simple correlation with the Lure score and the Same score in all of the hippocampal subfields of the bilateral hippocampus, left hippocampus and right hippocampus (FIGS. 5 and 6), only the left HATA demonstrated a significant negative correlation with the Lure score (FIG. 5; r=−0.26, p=0.049). When adjusted with use of TIV, gender, and age as the related factors in the multiple regression analysis, the left HATA, out of the subfields, demonstrated a significant trend with respect to the Lure score (left HATA; β=−0. 27, p=0.07).

Figure 7:
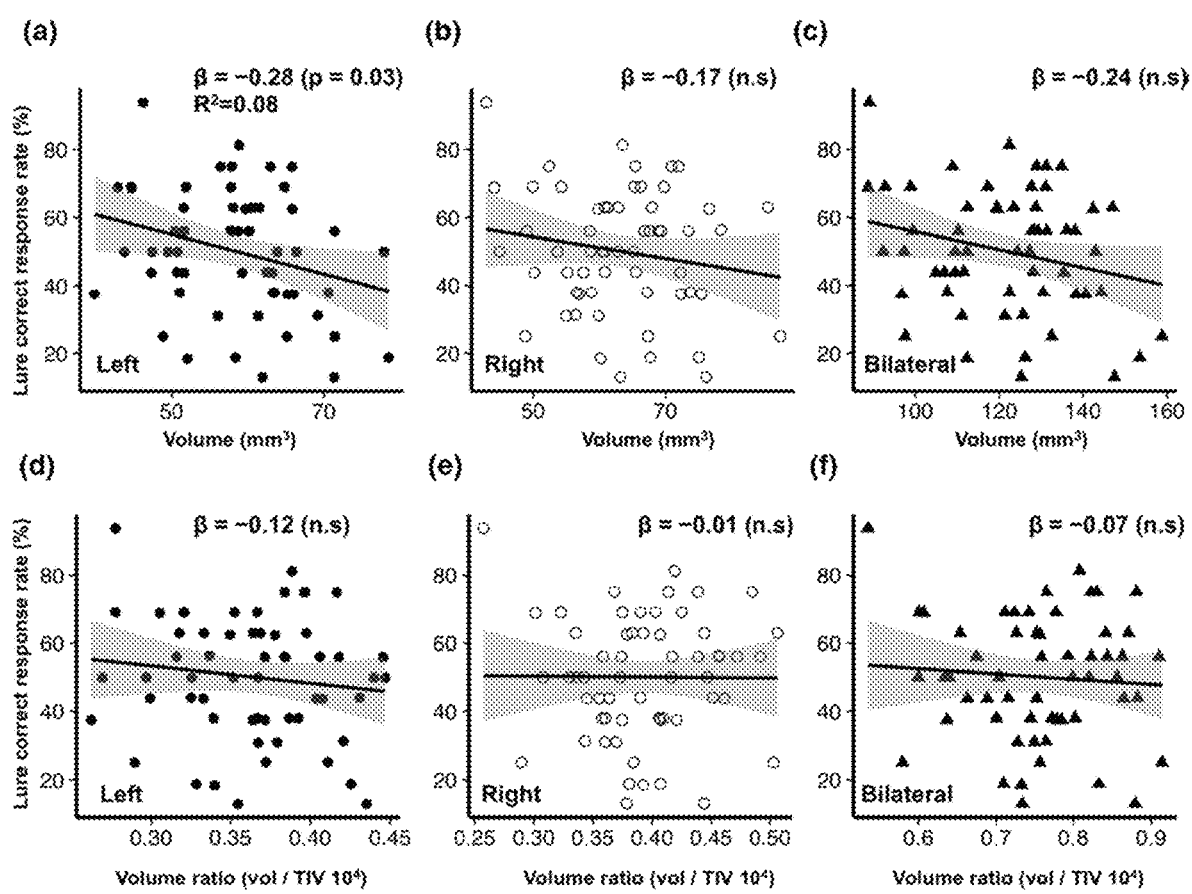
FIG. 7 contains scatter plots (a to f) between the volume of hippocampal-amygdaloid transition area (HATA) and Lure correct response rate (%), analyzed with use of standard resolution T1 data, where the comparison is given on the volume basis for (a to c), meanwhile on the basis of (volume/total intracranial volume)×$10^4$ for (d to f).

Also a negative correlation was confirmed between the volume of hippocampal-amygdaloid transition area (HATA) and the Lure correct response rate (%) (FIG. 7 (a to f)).

Figure 8:
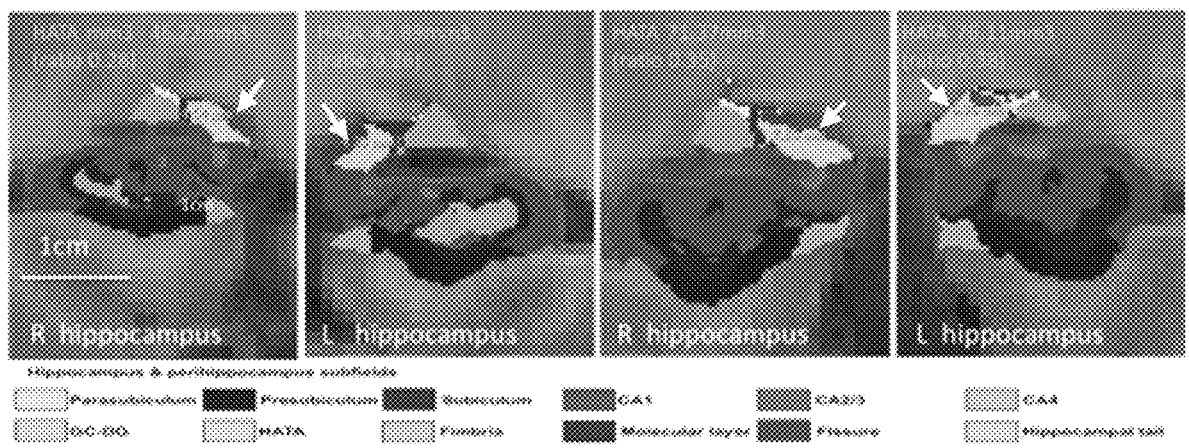
FIG. 8 contains views regarding analytical results of fMRI on the subjects given a behavioral task, illustrating HATA volumes of a 22-year-old male top scorer who scored 98 (where average correct response rate among 31 males was 49.9±21.3, in mean±SD), and of a 22-year-old lowest scorer who scored 13. "Ratio" is given in (volume/TIV)×$10^4$.
Figure 8:
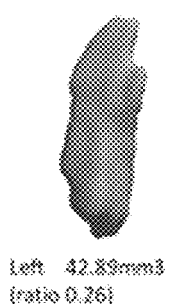
Figure 8:
Figure 8:
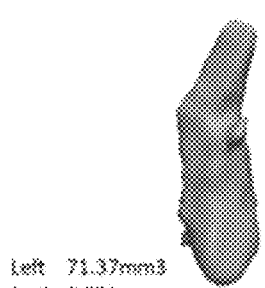
Figure 8:
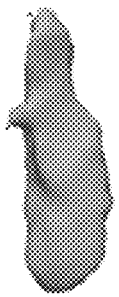

The present inventors further measured, by fMRI, the hippocampal pattern separation of the subjects preliminarily given a hippocampal behavioral task. The HATA volumes of a 22-year-old male top scorer who scored 98 (where average correct response rate among 31 males was 49.9±21.3, in mean±SD), and of a 22-year-old lowest scorer who scored 13 are illustrated (FIG. 8). "Ratio" means a value obtained by dividing the subfield volume by the total intracranial volume (TIV), and then multiplying by $10^4$.

The highest scorer was found to demonstrate small values in TIV: 1664.9 ml, left HATA: 42.89 $mm^3$, and ratio: 0.26; meanwhile the lowest scorer was found to demonstrate large values in TIV: 2011.3 ml, left HATA: 71.37 $mm^3$, and ratio: 0.35.

As described above, the male young subjects demonstrated the volumes of the left DG and the left fimbria, out of the hippocampal subfields, larger than those of the female subjects. Despite such volume difference, no gender differences were observed in the task scores and the response times regarding the pattern separation and the pattern completion. A significant negative correlation was observed only between the pattern separation and the left HATA, and the left HATA further demonstrated marginally significant negative correlation, after adjusted with the brain volume, gender and age as the related factors.

The present inventors thus confirmed that the hippocampal function of a subject may be evaluated by identifying the volume of the left hippocampal-amygdaloid transition area of the subject, and by in accordance with a negative association between the thus identified volume and the hippocampal function.

REFERENCE SIGNS LIST

10 Control device
11 Acquisition unit
13 Identification unit
15 Evaluation unit
20 Storage device
100 Hippocampal function evaluation system

The invention claimed is:

1. A functional evaluation system of hippocampus comprising:
   an acquisition unit that acquires image data representing a hippocampus of a subject; and
   an identification unit that performs image processing on the image data by software and identifies volume data representing a volume of a left hippocampal-amygdaloid transition area of the subject, in accordance with the image data; and
   an evaluation unit that evaluates a hippocampal function of the subject, in accordance with the volume data identified by the identification unit and a negative association between reference data that represents a volume of a left hippocampal-amygdaloid transition area and the hippocampal function.

2. The functional evaluation system of hippocampus according to claim 1, wherein
   the evaluation unit judges that the hippocampal function of the subject has decreased if a level indicated by the volume data is equal to or higher than a preset threshold level, meanwhile judges that the hippocampal function of the subject has increased if a level indicated by the volume data is smaller than the preset threshold level.

3. The functional evaluation system of hippocampus according to claim 1, wherein
the evaluation unit evaluates the hippocampal function of the subject, in accordance with difference between volume data (A) of the left hippocampal-amygdaloid transition area of the subject measured previously, and volume data (B) of the left hippocampal-amygdaloid transition area newly measured.

4. A method for creating data for evaluating a hippocampal function of a subject, the method comprising:
acquiring image data that represents a hippocampus of a subject; and
performs image processing on the image data by software and identifying volume data that represents a volume of a left hippocampal-amygdaloid transition area of the subject, in accordance with the image data; and
evaluating a hippocampal function of the subject, in accordance with the volume data identified by the identification unit and a negative association between reference data that represents a volume of a left hippocampal-amygdaloid transition area and the hippocampal function.

* * * * *